United States Patent
Burriez et al.

(10) Patent No.: US 7,137,235 B2
(45) Date of Patent: Nov. 21, 2006

(54) DEVICE AND METHOD FOR PACKAGING IN BLOCK FORM A SHEATHED HOT-MELT ADHESIVE PRODUCT

(75) Inventors: Hervé Burriez, Vineuil (FR); Paul Grover, Wauwatosa, WI (US)

(73) Assignee: Bostik SA, Puteaux (FR)

( * ) Notice: Subject to any disclaimer, the term of this patent is extended or adjusted under 35 U.S.C. 154(b) by 92 days.

(21) Appl. No.: 10/963,411

(22) Filed: Oct. 12, 2004

(65) Prior Publication Data

US 2006/0075723 A1    Apr. 13, 2006

(51) Int. Cl.
B65B 9/00 (2006.01)
(52) U.S. Cl. .............................. 53/450; 53/469; 53/477
(58) Field of Classification Search .................. 53/434, 53/440, 450, 463, 469, 477, 513, 127, 547, 53/548; 264/148; 206/447
See application file for complete search history.

(56) References Cited

U.S. PATENT DOCUMENTS

| | | | |
|---|---|---|---|
| 3,469,363 A | 9/1969 | Berkmoes | |
| 3,723,035 A * | 3/1973 | Franke | 264/148 |
| 4,054,632 A * | 10/1977 | Franke | 264/148 |
| 4,363,205 A * | 12/1982 | Hollander, Jr. | 53/434 |
| 4,642,973 A * | 2/1987 | Cullen et al. | 53/547 |
| 4,759,170 A | 7/1988 | Sawa et al. | |
| 5,041,251 A | 8/1991 | McCoskey et al. | |
| 5,112,552 A | 5/1992 | Wittmann et al. | |
| 5,292,468 A | 3/1994 | Colombani | |
| 5,373,682 A | 12/1994 | Hatfield et al. | |
| 5,392,592 A | 2/1995 | Bozich et al. | |
| 5,401,455 A | 3/1995 | Hatfield et al. | |
| 5,669,207 A * | 9/1997 | Hull | 53/440 |
| 5,715,654 A | 2/1998 | Taylor et al. | |
| 5,804,610 A | 9/1998 | Hamer et al. | |
| 5,806,285 A | 9/1998 | Rizzieri | |
| 5,819,505 A | 10/1998 | Fayolle et al. | |
| 5,865,927 A | 2/1999 | Puletti et al. | |
| 5,869,555 A | 2/1999 | Simmons et al. | |
| RE36,177 E | 4/1999 | Rouyer et al. | |
| 5,942,082 A | 8/1999 | Winter et al. | |
| 5,942,569 A | 8/1999 | Simmons et al. | |
| 5,987,852 A | 11/1999 | Bozich et al. | |
| 6,006,497 A | 12/1999 | Waver et al. | |
| 6,044,625 A | 4/2000 | Waver et al. | |
| 6,067,776 A | 5/2000 | Heuer et al. | |
| 6,120,899 A | 9/2000 | Cameron et al. | |
| 6,138,441 A | 10/2000 | Kik et al. | |
| 6,155,029 A | 12/2000 | Jain | |
| 6,217,697 B1 | 4/2001 | Winter et al. | |
| 6,230,890 B1 | 5/2001 | Waver et al. | |

(Continued)

FOREIGN PATENT DOCUMENTS

DE    2413575    9/1975

(Continued)

*Primary Examiner*—Louis Huynh
(74) *Attorney, Agent, or Firm*—Andrus, Sceales, Starke & Sawall, LLP

(57) ABSTRACT

A method for packaging in block form a sheathed hot-melt adhesive product comprises the steps: (a) of continuously supplying a sheathed hot-melt adhesive product, (b) of immersing the sheathed hot-melt adhesive product in a liquid refrigerant, (c) of pressing the sheathed adhesive product at a portion thereof, (d) of ultrasonically welding the sheathed adhesive product at the pressed portion; and (e) of cutting the sheathed adhesive product into a block at the pressed portion. A block of sheathed hot-melt adhesive product and an installation for packaging a sheathed hot-melt adhesive product are also provided.

12 Claims, 3 Drawing Sheets

| U.S. PATENT DOCUMENTS | | | | EP | 0957029 | 11/1999 |
|---|---|---|---|---|---|---|
| 6,238,732 B1 | 5/2001 | Cameron et al. | | EP | 1535847 | 6/2005 |
| 6,430,898 B1 | 8/2002 | Remmers et al. | | WO | WO94/13451 | 6/1994 |

FOREIGN PATENT DOCUMENTS

| DE | 19913034 | 11/1999 |
|---|---|---|

\* cited by examiner

DEVICE AND METHOD FOR PACKAGING IN BLOCK FORM A SHEATHED HOT-MELT ADHESIVE PRODUCT

BACKGROUND OF THE INVENTION

The invention relates to a novel device and a novel method for packaging in block form a sheathed hot-melt adhesive product.

Various ultrasonic welding devices are known.

Ultrasonic waves are waves with frequencies typically ranging between 15 kHz and a few hundred megahertz. High-intensity ultrasonic waves are able to alter the medium in which they propagate, with repercussions on the physicochemical properties of the medium.

An ultrasonic weld normally requires a transducer, a sonotrode and an anvil. The transducer produces ultrasound from which ultrasonic vibrations are generated. If applicable, a speed transformer amplifies these vibrations and transmits them to a sonotrode, which generally takes the form of a metal finger that can be vibrated at ultrasonic frequency. Layers of elements to be welded are generally placed between the anvil and the sonotrode. The hammering experienced locally transforms the elements and permits local interpenetration of the surfaces of these elements. The temperature rises, the deformation zone extends, and the weld is achieved. The weld is typically obtained in a few tenths of a second.

Routine applications using ultrasound include the cutting and slicing of soft products, stripping, the perforation of thin products, and the welding of hot-melt materials.

Various devices for packaging hot-melt adhesives are also known.

For example, in WO-A-94/13451, a mass of hot-melt adhesive is packaged directly by pouring or pumping the molten adhesive into a cylindrical thermoplastic tube, the cylindrical tube being in contact with a heat sink.

The packaged article resulting from this operation is supplied in the form of a handable bag or block which can be manufactured in an in-line operation.

In particular, the adhesive-filled tube is passed through rollers that press or pinch the filled cylinder in order to form bags of appropriate length. A liquid refrigerant is sprayed until the packaging is sufficiently cooled, so that the packaged adhesive forms a seal at the pressed or pinched portions. The sets of bags can then be cut at the pressed portions using conventional means, for example mechanical shears, laser, water jet, knife or hot wire, and then cooled to ambient temperature.

Document EP-A-0 957 029 discloses a method and an installation for packaging an adhesive product and similar products, the liquid adhesive product being sheathed in a protective sheath of a nonadhesive thermoplastic material. The adhesive product is sheathed by a coextrusion method. The coextrusion product thus formed, composed of the adhesive product and the protective sheath, is, at least as regards the protective sheath, solidified.

The advantage of sheathing the adhesive product in a nonadhesive sheath resides in the possibility of handling (particularly for transport, storage or packaging) or using the product after its manufacture.

It is also known to use a sheath that is miscible with the hot-melt adhesive at a given temperature. In this way, the product and its sheath can be melted together before application, without the need to remove the sheath.

However, the methods and devices described above are not compatible with the packaging of bags or blocks weighing more than 0.5 kg, and for certain compositions and sheath thicknesses. In fact, the heat and pressure exerted by the hot material in the sheath of the block formed are detrimental to the quality of the seal of the sheath. Typically, when the mass of sheathed adhesive exceeds the above values, the seal of the sheath yields (gaping occurs) at certain places. The adhesive product then comprises sticky zones that are detrimental to the subsequent handling or use of the product.

SUMMARY OF THE INVENTION

Hence a need exists for an installation and a method for packaging in block form a sheathed hot-melt adhesive product permitting the packaging of blocks heavier than 0.5 kg.

For this purpose, the invention relates to a method for packaging in block form a sheathed hot-melt adhesive product comprising the steps: (a) of continuously supplying a sheathed hot-melt adhesive product; (b) of immersing the sheathed hot-melt adhesive product in a liquid refrigerant; (c) of pressing the sheathed adhesive product at a portion thereof; (d) of ultrasonically welding the sheathed adhesive product at the pressed portion; and (e) of cutting the sheathed adhesive product into a block at the pressed portion.

In preferred embodiments, the method according to invention comprises one or more of the following features:
  the pressing step, the ultrasonic welding step and the cutting step are carried out at the same work station;
  the pressing and welding steps use a sonotrode;
  the cutting step uses a knife in sliding contact with an anvil;
  the cutting step is concomitant with the ultrasonic welding step;
  the immersion step (b) is a step of immersion of the adhesive product in refrigerated water;
  the sheathed adhesive product is cut in step (c) into a block with a length substantially equal to 120 or 330 mm;
  the sheathed adhesive product supplied in step (a) comprises a nonadhesive sheath;
  the packaging method further comprises a step of sheathing a hot-melt adhesive, prior to step (a);
  the prior sheathing step is a step of coextruding the hot-melt adhesive with the sheath; and
  the prior sheathing step is a step of pumping the hot-melt adhesive into the sheath.

The invention further relates to a block of sheathed hot-melt adhesive product comprising: a hot-melt adhesive and a sheath ultrasonically welded at two ends thereof, containing the hot-melt adhesive, the block weighing 0.5 kg or more and preferably 1.4 kg or more.

In preferred embodiments, the block of sheathed hot-melt adhesive product according to the invention further comprises one or more of the following features:
  the hot-melt adhesive is coextruded with the sheath; and
  the hot-melt adhesive and the sheath are miscible at a given temperature.

The invention further relates to an installation for packaging a sheathed hot-melt adhesive product comprising: means for introducing a sheathed hot-melt adhesive product, upstream of a conveyor route for this product; refrigeration means comprising a liquid refrigerant, along the conveyor route; means for conveying the adhesive product along the conveyor route; means for pressing the adhesive product; means for ultrasonically welding the adhesive product;

means for cutting the adhesive product; and means for synchronized control of the pressing and welding means, in which the pressing, welding and cutting means are immersed in the liquid refrigerant.

In preferred embodiments, the packaging installation for a sheathed hot-melt adhesive product according to the invention further comprises one or more of the following features:
- the pressing, welding and cutting means are situated substantially at the same location on the conveyor route; and
- the ultrasonic welding means comprise a sonotrode and the pressing means comprise the sonotrode and an anvil;
- the cutting means comprise a knife mounted in sliding contact with the anvil;
- the welding means are designed to be rotated at a variable angular speed;
- the liquid refrigerant is refrigerated water; and
- the means for introducing the sheathed hot-melt adhesive product comprise a coextruder.

Other features and advantages of the invention will appear on reading the description that follows of preferred embodiments of the invention, given by way of example and with reference to the drawings appended hereto.

DETAILED DESCRIPTION OF PREFERRED EMBODIMENTS

The invention provides a method for packaging in block form a sheathed hot-melt adhesive product. This method comprises a first step of continuously supplying a sheathed hot-melt adhesive product followed by a step of immersing this product in a liquid refrigerant. The method further comprises a pressing step, a step of ultrasonically welding the adhesive product at a portion thereof, followed by a step of cutting the product into blocks. This method can be put into practice on a packaging installation, also according to the invention, first comprising means for introducing a sheathed hot-melt adhesive product, upstream of a conveyor route for the product. It further comprises refrigeration means comprising a liquid refrigerant and means for conveying the adhesive product along the conveyor route. The installation further comprises pressing means, ultrasonic welding means and cutting means for cutting the adhesive product. The pressing, welding, and, if applicable, cutting means are operated by synchronized control means. The pressing, welding and cutting means are further immersed (at least partially) in the liquid refrigerant. This method and this installation, thanks in particular to the submerged ultrasonic welding, permit the packaging of blocks weighing more than 0.5 kg, indeed 1.4 kg and more.

Figure 1:
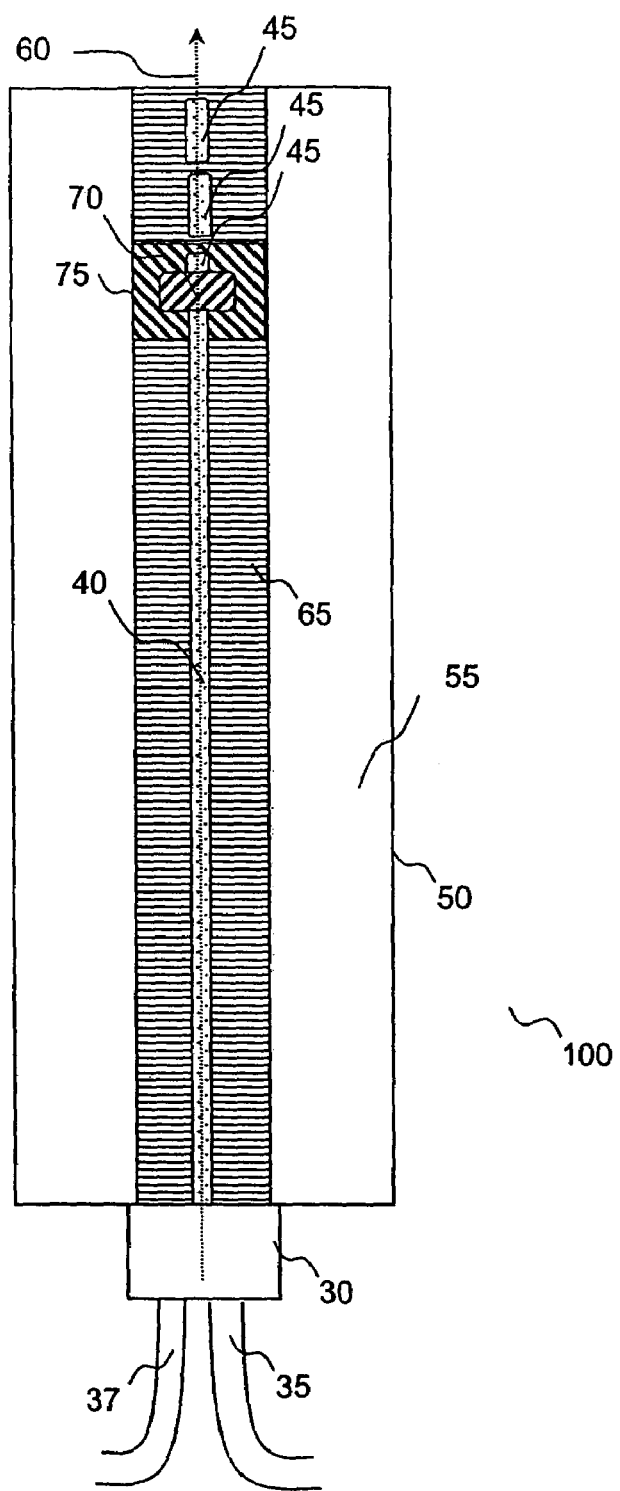
FIG. 1 is a schematic representation of an installation for packaging a sheathed hot-melt adhesive product according to one embodiment of the invention.

With reference to FIGS. 1 to 4, the packaging installation according to the invention comprises means 30 for introducing a sheathed hot-melt adhesive product 40 to means 65 for conveying this product, which define a conveyor route, shown by a dotted arrow 60 in FIG. 1. The introduction means 30 are upstream of the conveyor means 65 along the route.

The installation further comprises refrigeration means 50 comprising a liquid refrigerant 55. Downstream of the introduction means 30, passage means 70, 75 and ultrasonic welding means 70, 75, are operated by means for synchronized control (not shown) of the preceding means. The pressing means 70, 75, welding means and cutting means (not shown) are immersed in the liquid refrigerant 55.

The hot-melt adhesive product 40 leaving the introduction means 30 has, for example, a substantially cylindrical shape. The conveyor means 65, for example, take the form of adjacent rollers, preferably covered with a flexible material of the foam type.

After its introduction to the conveyor means 65, the product is conveyed to the pressing means 70, 75. The sheathed adhesive product can thus first be pinched or pressed at a portion thereof by the pressing means 70, 75. The product thickness subsisting at this portion after pressing is accordingly reduced to a much smaller value than the initial thickness, for example substantially twice the typical thickness of the product sheath. The remaining layer can then be welded by the ultrasonic welding means, which advantageously permit rapid welding and are easily automated. The fact that the welding operation is submersible allows cold welding. The resulting weld is thus more stable, with very little subsequent creep of the sheath observed, and very little or no gaping at the seal, even for blocks 45 weighing more than 0.5 kg. Furthermore, the seal thus obtained preserves its properties for blocks weighing 1.4 kg and more or 330 mm and longer. The pressing, welding and cutting of the adhesive product will be discussed in greater detail with reference to FIGS. 5 to 7.

The product can then be cut by the cutting means, in order to supply blocks 45 of such size as to be easily handled (for example, in a size adapted to batch packaging for transport or storage of said batch) or adapted to the user's needs. The configuration of the installation in FIG. 1 makes it possible to easily vary the duration of the welding cycle, and thereby to vary the length of the blocks 45 without any other modification than the parameterizing of the control means of the pressing and welding means 70, 75. This permits a transition from a production session for producing blocks of adhesive product of a first length, for example 120 mm, to a new production session for producing blocks of a different length from the first, for example 330 mm, without significantly interrupting production, indeed without any interruption at all. This makes it possible to adapt the final product very easily.

In one embodiment, the pressing means 70, 75, welding means and cutting means are situated substantially at the same place on the conveyor route, thereby improving the ergonomics of the installation. The pressing and ultrasonic welding means can, for example, form a single work station in the installation. If necessary, the pressing function and the welding function can both involve a sonotrode 70 (or as a variant, a plurality of sonotrodes 70 as shown below). The sonotrode must accordingly be able to move relative to the product, particularly by undergoing translational movement along an axis, for example, along a z axis. Two distinct amplitudes of complex motion of the sonotrode along this axis can be distinguished. A first amplitude corresponds to the pressing and a second amplitude corresponds to the ultrasonic vibration welding. The same sonotrode accordingly serves both for the pressing and the welding, which is advantageous in terms of ergonomics and facilitates the tracking of the traveling hot-melt adhesive product (see below) with regard to servocontrol.

In one embodiment, a plurality of parallel sonotrodes are used, preferably close to each other but not contiguous, in a transverse plane to the product conveyor direction. This serves to increase the welding width. It is nonetheless possible to preserve an amplification adapted to each of the sonotrodes by commensurately increasing the number of associated amplifiers, at least when the sonotrodes are not contiguous.

The pressing means 70, 75 and welding means may further comprise an anvil 75. The sheathed adhesive product can then be pressed between the sonotrode 70 and the anvil 75.

With regard to pressing, the anvil 75 may be stationary while the sonotrode 70 can move along one or more axes and vice versa, thereby ensuring the pressing. Alternatively, the sonotrode 70 and the anvil 75 can both move along one or more axes. The amplitude of motion necessary for pressing is thus shared between the sonotrode 70 and the anvil 75. However, it is unnecessary for the amplitudes of the sonotrode and the anvil to be the same.

Figure 2:
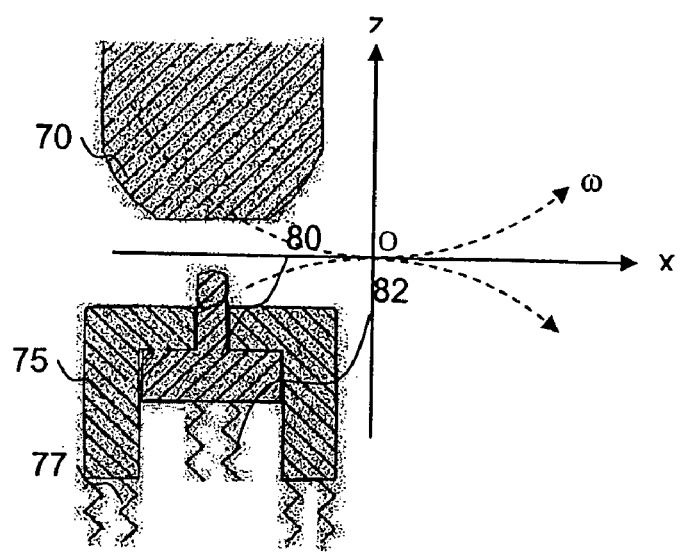
FIG. 2 is a schematic cross-sectional view of the pressing, welding and cutting means of a packaging installation according to an embodiment, in a first phase of an operating cycle.
Figure 3:
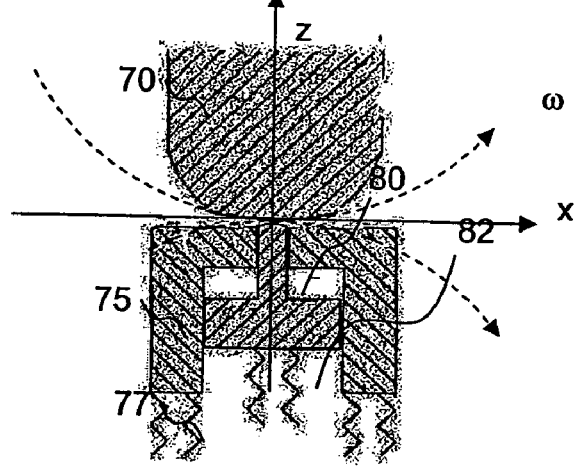
FIG. 3 is a schematic cross-sectional view of the means in FIG. 2, in a second phase of the operating cycle.
Figure 4:
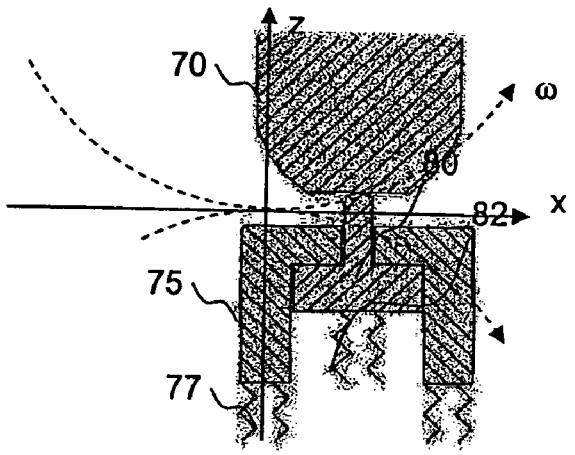
FIG. 4 is a schematic cross-sectional view of the means in FIG. 2, in a third phase of the operating cycle.

More particularly, with reference to FIGS. 2 to 4, the cutting means can now advantageously take the form of a knife 80 mounted in sliding contact with the anvil 75. Thus the cutting can take place immediately after welding, indeed concomitantly. Furthermore, the servocontrol of the cutting means is thereby easier, because of the single degree of freedom remaining to the knife 80.

In one embodiment, the welding means and, preferably, both the pressing and welding means, are designed to rotate about an axis of rotation contained in a plane substantially perpendicular to the direction of the conveyor route.

The movement of these means is preferably ellipsoidal rather than circular, in order to improve the tracking of the product. In the example of the embodiment in FIGS. 1 to 4, the axis of rotation is substantially perpendicular to the (x, z) plane (in another embodiment, this axis could nonetheless be substantially parallel or merged with the z axis). It may be observed, in FIGS. 2 to 4, that the conveyor direction corresponds to the x axis and that the amplitudes are not to scale but are exaggerated for easier understanding. Such movement can furthermore be described as composed of two translations about two different axes, for example the x and z axes in FIGS. 2 to 4. Thanks to the movements of the pressing/welding means, the relative speed between the pressing and welding means, on the one hand, and the adhesive product on the other, can be reduced to substantially zero, independently of the product conveying speed.

Such an embodiment is more particularly shown in FIGS. 2 to 4, which show a schematic cross-sectional view of welding means of a packaging installation, in successive phases of an operating cycle.

The FIGS. show the sonotrode 70 on the one hand and the anvil 75 and the knife 80 on the other hand, each actuated with a rotary or ellipsoidal motion about the y axis (not shown). The anvil 75 and the knife 80 are preferably each mounted at or on springs 77, 82, which serve in particular to absorb vibrations like those produced by the sonotrode during the welding at ultrasonic frequencies. With regard to the knife, the coils of the corresponding spring 82 are preferably substantially touching when the knife is retracted (which corresponds to "point O" see below). Preferably, the coils are situated within a safe distance to avoid premature cutting at point O. The rotary motion is symbolized by dotted curved arrows in FIGS. 2 to 4. The dotted lines actually correspond to the path followed by a point on the sonotrode 70 and by a point on the anvil 75 or on the knife 80.

It must however be kept in mind that the path of the anvil could nonetheless be reduced to a simple translation along the x direction.

In a given first phase (FIG. 2), the anvil 75 and the sonotrode 70 move closer together (z direction), while having a nonzero speed component along x, substantially adjusted to the speed of travel of the adhesive product. The knife 80 is set in the raised position.

Point O, at the origin of the reference x, z (in FIG. 2) corresponds to the position of the anvil 75 and of the sonotrode 70 at the point of virtual contact between them, that is, a position in which a cold seal can be produced (second phase, FIG. 3), the knife being in the retracted position. This cold seal may be followed by ultrasonic welding while the anvil and sonotrode are still in the configuration in FIG. 3. The latter two points will be clarified with reference to FIGS. 5 to 7.

In a third phase (FIG. 4), the sonotrode 70 and the anvil 75 are separated from one another. The knife 80 rises, if applicable, and is returned elastically in the direction of the sonotrode 70, for example actuated by the spring 82. An order can then be sent to the sonotrode 70 to transmit ultrasonic vibrations, in order to weld and cut an adhesive product at the seal of the sheath (cold seal) and in the neighborhood of the knife 80, which is in the raised position. This point will also be clarified with reference to FIGS. 5 to 7.

Preferably, the rotary motion can have a variable angular speed during a welding cycle, the movements of each of the pressing and welding means being coordinated by the control means. This serves to improve the product tracking speed, particularly at the time and level of welding.

In one embodiment, the parameterizing of the angular speed of all or part of the pressing and welding means mainly comprises two phases. A first phase corresponds to a synchronization of the preceding means with the sheathed adhesive product, which travels, and a second phase corresponds to a resumption of the cycle, the two phases being separated by transition phases, that is, acceleration and deceleration phases. The general variables D, t and V respectively denote an angle (or angular distance), a time and a speed associated with the pressing/welding and cutting means and, in particular, with the sonotrode. In the first phase, D1, t1 and V1 can be associated, and similarly, in the second phase, D2, t2 and V2 can be associated. Da, ta, and Va are also associated with the acceleration and deceleration phases. In this way, the various angular distances satisfy the equation:

$$D1+D2+2Da=360°$$

Similarly, the various associated times satisfy:

$$t1+t2+2ta=T$$

where T is the duration of a cycle. The return time Tr corresponds to t2+2 ta (which can be associated with an angular distance Dr).

The speed during the first phase, or V1, can be adjusted in order to optimize the synchronization with the traveling product. The average speed during the second phase can be adjusted as a function of the travel speed of the adhesive product and the desired block length.

Preferably, V1 is variably parameterized about an average speed V1ave, with a minimum corresponding to the welding zone, in order to offer greater flexibility for the synchronization with the traveling sheathed hot-melt adhesive product.

For this purpose, it is possible to use a brushless motor, with reduction gear, to drive the sonotrode and/or the anvil 75. This type of motor offers advantages in terms of heat dissipation, flexibility, and allows the use of a higher voltage. For example, it is possible to select a motor developing a torque of 11 N/m.

The angular position of the sonotrode, measured from the conveyor direction, at which the order can be sent to the sonotrode to transmit the ultrasonic vibrations for the purpose of welding and cutting in the neighborhood of the knife is, for example, between 180 and 190 degrees (or between 0 and 10 degrees, depending on the measurement direction selected). The vibration time, for example, is between 0.1 and 0.7 s.

Tables 1 and 2 below list a selection of parameters used and results obtained, on average, thanks to the packaging installation and/or method according to the invention. These tables relate to a first and a second type of packaging, in which a block length of 120 mm and 330 mm respectively is desired.

Examination of these tables shows first that the same production rate (2000 kg/h or more if required) is achievable, independently of the desired block length (and hence weight). It also appears that the same installation and/or method allow(s) adaptation to various types of desired packaging, without involving substantial modifications other than the parameterizing of the control means of the pressing/welding/cutting means. In this respect it should be noted that it is possible to preserve the same travel speed, so that the introduction means (or the supply step) for introducing sheathed adhesive product do not need to be modified. It should also be noted that the parameterizing of t1, D1, V1 remains identical in the example in Tables 1 and 2. In fact, it is possible to make a fine adjustment of these parameters, for example, depending on the type and throughput of adhesive product supplied and also of the desired production rate, and to preserve the same parameters when changing the type of packaging. The parameters corresponding to the resumption of the cycle will be adjusted in accordance with the new type of packaging desired, of a different length.

TABLE 1

First example of packaging diagram

| | |
|---|---|
| Block length | 120 mm |
| Production rate | 2000 kg/h |
| Block height (?) | 66 mm |
| Block radius | 40 mm |
| Tracking after cutting (?) | 10 mm |
| Block weight | 0.55 kg |
| Cycle time for one block | 0.98 s |
| Adhesive product travel speed | 122 mm/s |
| Linear synchronization | 49 mm |

TABLE 1-continued

First example of packaging diagram

| | |
|---|---|
| distance at pressing/welding | |
| t1/D1/V1 | 0.40 s/94°/4.1 rad/s |
| Tr/Dr | 0.58 s/266° |
| ta | 0.11 s |
| a (acceleration during ta) | 45.1 rad/s$^2$ |
| t2, V2 | 0.36 s/8.9 rad/s |

TABLE 2

Second example of packaging diagram

| | |
|---|---|
| Block length | 330 mm |
| Production rate | 2000 kg/h |
| Average block height (?) | 66 mm |
| Average block radius | 40 mm |
| Tracking after cutting (?) | 10 mm |
| Block weight | 1.50 kg |
| Cycle time for one block | 2.70 s |
| Adhesive product travel speed | 122 mm/s |
| Linear synchronization | 49 mm |
| distance at pressing/welding | |
| t1/D1/V1 | 0.40 s/94°/4.1 rad/s |
| Tr/Dr | 2.30 s/266° |
| ta | 0.24 s |
| a (acceleration during ta) | −9.6 rad/s$^2$ |
| t2, V2 | 1.82 s/1.8 rad/s |

Moreover, again with reference to FIG. 1, it is possible to choose refrigerated water as the liquid refrigerant, preferably having a temperature maintained below 5° C. The adhesive is at a much higher temperature (typically between 90 and 200° C.), allowing its introduction into the conveyor means and, if applicable, its manufacture.

The manufacture of the sheathed hot-melt adhesive product can be considered, for example, by coextrusion or by pumping of the adhesive into the sheath, as will now be described.

In one embodiment, the means 30 for introducing the adhesive product comprise a coextruder 30. Pipes 35, 37 can, for example, permit the entry of each of the adhesive and sheath products into the coextruder 30, in which these products are then coextruded in order to supply a sheathed adhesive product 40. Preferably, the sheath is nonadhesive, so that the blocks are easier to handle. This facilitates the subsequent packaging and logistics of the blocks: for example, it is possible to package several blocks, without them sticking to one another, for the purpose of transport. Also preferably, the hot-melt adhesive has a core melting point higher than or equal to that of its sheath. At the very least, they are miscible at a given temperature, compatible with the desired application, as mentioned above. In this way, the adhesive and the sheath can be melted together, as known in the art. A uniform product is thereby obtained, and its characteristics remain substantially identical to those of the adhesive alone, as regards the weight ratio of the two components.

Figure 5:
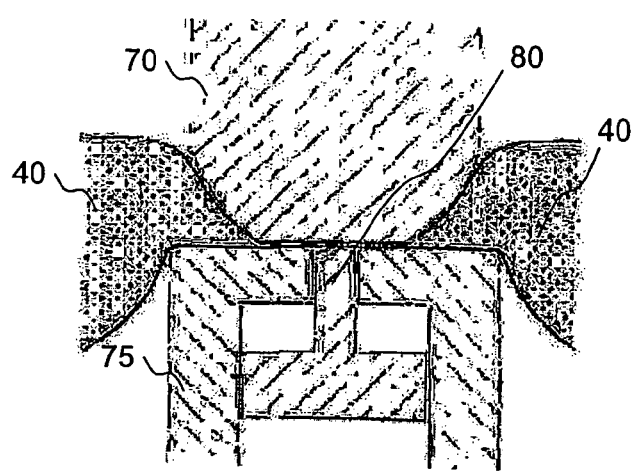
FIG. 5 is a schematic cross-sectional view of the means in FIG. 2, operating on a hot-melt product, in the second phase of the cycle.
Figure 6:
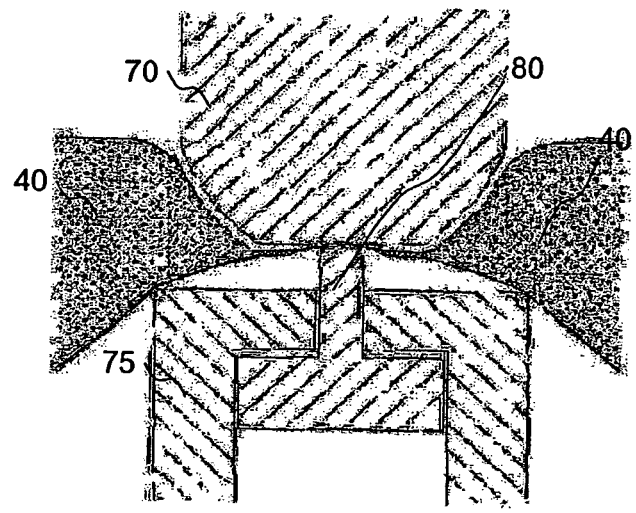
FIG. 6 is a schematic cross-sectional view of the means in FIG. 2, operating on the hot-melt product, in the third phase of the cycle.
Figure 7:
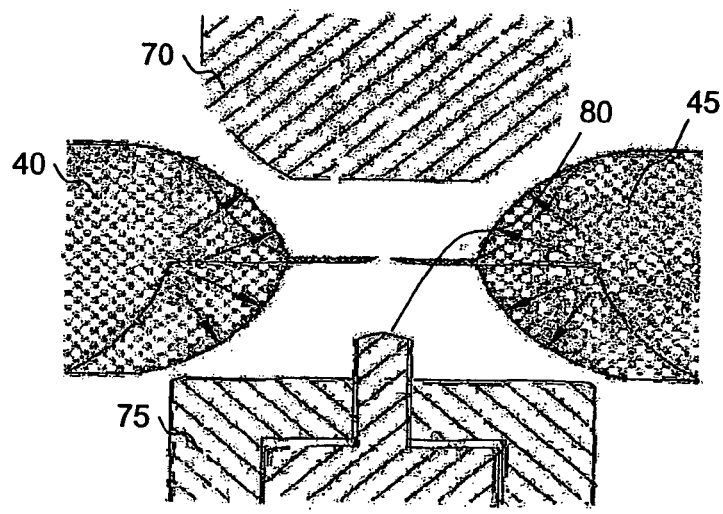
FIG. 7 is a schematic cross-sectional view of the means in FIG. 2, operating on the hot-melt product, in a fourth phase of the cycle.

The invention further relates to a packaging method, as mentioned above, which is now described more specifically with reference to FIGS. 5 to 7.

The first step of continuous supply of a sheathed hot-melt adhesive product can be carried out using the introduction means discussed above. Immediately afterwards or later, the adhesive product is immersed in a liquid refrigerant. This immersion serves to cool the sheathed adhesive product in order to ensure the integrity of the membrane, if necessary.

If applicable, immersion is carried out using the immersion means discussed above. The pressing step of the sheathed adhesive product, at a portion thereof, can also be carried out using the means described with reference to the installation according to the invention.

In this respect, FIG. 5 shows a schematic cross-sectional view of the means in FIG. 2, particularly of the pressing means, operating on a sheathed hot-melt product in the second phase of the cycle and according to one embodiment.

In this phase of the cycle, the sonotrode 70 and the anvil 75 are at point O, corresponding to the virtual contact point between one another, or to the pressing position. FIG. 5 shows a portion or part of the adhesive product pressed between the sonotrode 70 and the anvil 75. The pressing is aimed at permitting a cold seal, as explained above.

After pressing, a thin layer of adhesive product remains between the sonotrode 70 and the anvil 75. Preferably, this layer only substantially comprises the protective sheath of the adhesive product. The spacing between the sonotrode 70 and the anvil 75 at point O can be provided accordingly. The subsisting layer therefore has a thickness close to twice the average thickness of the sheath. Pressed between the sonotrode 70 and the anvil 75, the layer has a temperature typically much lower than that of the adhesive product, which, for example, is 110° C. in the body, when it leaves the introduction means. The pressing generates stresses in the adhesive product, particularly in the neighborhood of the sonotrode/anvil combination.

In one embodiment and after the order has been sent by the control means to the sonotrode 70, the adhesive product 40, held between the sonotrode 70 and the anvil 75 at point O, can be hammered from the sonotrode 70 towards the anvil 75, at ultrasonic frequency. The modifications of the medium subjected to this hammering and, in particular, the interpenetration of the hammered layers, reinforce the cold seal previously obtained.

However, the welding order is preferably only sent when the sonotrode, the anvil 75 and the knife 80 are in the position shown in FIG. 6.

The packaging method according to the invention then comprises a welding step and a step of cutting the sheathed adhesive product into a block.

In this respect, FIG. 6 shows a schematic cross-sectional view of the means in FIG. 2, operating on the hot-melt product in the third phase of the cycle.

In this third phase of the cycle, the sonotrode 70 moves away from the anvil 75. If necessary, the control means can activate the knife 80 to cut the welded layer or alternatively, the knife 80 can be returned by a spring towards the sonotrode 70. The loading of this layer by the knife 80 can further be designed in order to permit the maintenance of a gap, on the one hand between this layer and the sonotrode 70, and on the other, between the layer and the anvil 75 (as shown in FIG. 6) to avoid damaging the layer.

In one embodiment, the order can be sent to the sonotrode 70 to transmit mechanical vibrations at ultrasonic frequency, while the sonotrode 70 and the anvil 75 are in the position in FIG. 6. The hammering of the layer against the upper walls of the knife 80 causes both welding and cutting of the sheathed adhesive product, at the level of the layer pinched between the sonotrode 70 and the knife 80.

The sonotrode 70 and the knife 80 thereby permit welding in the neighborhood of the cutting zone. The quality of the weld, that is in particular its subsequent strength, is thereby improved. Since, during pressing, the first seal has been made as a cold seal, the brittle zones are minimized at the seal, or even eliminated. Hence there is little or no leakage possible.

Note that the cutting angle may be important as regards, on the one hand, the quality and time of the cutting and, on the other, the strength of the materials of the sonotrode and of the knife 80. The knife must be sufficiently flat to allow welding and also sufficiently pointed to permit targeted cutting of the welded layer, at an appropriate time, that is, after a sufficient time interval for the welding to have taken place. In this respect, the tests conducted show that angles between 5 and 15 degrees, measured from the transverse plane of the knife, are ideal. These angles can nonetheless vary according to the composition of the membrane, and the dimensions and travel speed of the sheathed adhesive product.

For example, it is possible to select the sonotrode and knife materials from steel, titanium or alloys of both.

The quality of the seal can be further improved by combining the embodiment comprising a first ultrasonic welding just after the pressing, and the embodiment comprising a second ultrasonic welding, at least partially concomitant with the cutting, as explained above. Thus, during the first welding, a relatively wide portion (substantially corresponding to the cold seal zone) of the sheath is ultrasonically welded. During the second welding, a narrower zone, limited to the vicinity of the knife, is welded. Such a welding combination serves to further decrease the risk of leakage at the sheath seal after cutting.

FIG. 7 shows a schematic cross-sectional view of the means in FIG. 2, operating on the hot-melt product, in a fourth step of the cycle.

This fourth step can, if necessary, correspond to the first phase of the cycle described above. In this fourth step, the sonotrode continues to move away from the anvil 75. A portion 40 of adhesive product remains integral with the adhesive product supplied continuously, while another portion 45 is detached therefrom, after the cutting step. The portion 45 (partially shown) forms a block. The internal pressure of the adhesive product, in its sheath, can cause hemispherical deformation of the ends of the adhesive product (as shown by comparing FIGS. 7 and 5).

It should be noted that during its conveyance, the sheathed adhesive product can undergo deformation. The substantially circular cross section of the product can be progressively flattened, ultimately to become ellipsoidal. Thus, the compactness of the blocks subsequently packaged in batches can be improved in comparison with that obtained with the circular-section blocks.

Such deformation can occur under the effect of gravity alone or can be favored by passage between the belts or rollers arranged in order to present a progressively decreasing inlet slot. As a variant, the product can be deformed after being cut into a block, although this is not preferable, because of the risk of damaging the ultrasonically welded seal.

Although the packaging method described above can be implemented independently of the installation according to the invention, it nonetheless procures the same advantages already discussed in relation to this installation.

This method and this installation allow in particular the packaging of blocks heavier than 0.5 kg, or even 1.4 kg and more.

In this respect, the invention further relates to a block of sheathed hot-melt adhesive product. This block comprises a hot-melt adhesive product and a sheath ultrasonically welded at two ends thereof, containing the hot-melt adhesive product. The block also weighs 0.5 kg or more and preferably 1.4 kg or more.

If applicable, the hot-melt adhesive product is coextruded with or pumped into the sheath.

Furthermore, the sheath may have a melting point lower than or equal to that of the adhesive or, at least, the sheath and the adhesive can be miscible at a given temperature, compatible with the planned application.

Moreover, in the above discussion, the hot-melt adhesive product is, for example, a pressure-sensitive hot-melt adhesive or a soft material. The sheath material used for the sheathing operation is typically a high molecular weight polymer material, a high molecular weight modified polymer material or a blend of high molecular weight polymers. Examples of such materials are: ethylene/vinyl acetate copolymers (EVA), ethylene acrylate or low-density polyethylene copolymers, metallocene or single-site or Ziegler-Natta ethylene copolymers, of high molecular weight.

However, the invention is not limited to the variants described above, but is susceptible to numerous other variations readily accessible to a person skilled in the art. In particular, the sharp angles of the edges of the anvil 75 as shown in FIGS. 5, 6 and 7 can be rounded to prevent tearing of the sheath.

What is claimed is:

1. A method for packaging in block form a sheathed hot-melt adhesive product comprising the steps:
(a) of continuously supplying a sheathed hot-melt adhesive product;
(b) of immersing the sheathed hot-melt adhesive product in a liquid refrigerant;
(c) of pressing the sheathed adhesive product at a portion thereof;
(d) of ultrasonically welding the sheathed adhesive product at the pressed portion; and
(e) of cutting the sheathed adhesive product into a block at the pressed portion.

2. The packaging method as claimed in claim 1, in which the pressing step, the ultrasonic welding step and the cutting step are carried out at the same work station.

3. The packaging method as claimed in claim 2, in which the pressing and welding steps use a sonotrode.

4. The packaging method as claimed in claim 3, in which the cutting step uses a knife in sliding contact with an anvil.

5. The packaging method as claimed in claim 1, in which the cutting step is concomitant with the ultrasonic welding step.

6. The packaging method as claimed in claim 1, in which the immersion step (b) is a step of immersion of the adhesive product in refrigerated water.

7. The packaging method as claimed in claim 1, in which the sheathed adhesive product is cut in step (c) into a block with a length substantially equal to 120 or 330 mm.

8. The packaging method as claimed in claim 1, in which the sheathed adhesive product supplied in step (a) comprises a nonadhesive sheath.

9. The packaging method as claimed in claim 1, further comprising a step of sheathing a hot-melt adhesive, prior to step (a).

10. The packaging method as claimed in claim 9, in which the prior sheathing step is a step of coextruding the hot-melt adhesive with the sheath.

11. The packaging method as claimed in claim 9, in which the prior sheathing step is a step of pumping the hot-melt adhesive into the sheath.

12. A method for packaging in block form a sheathed hot-melt adhesive product comprising the steps:
(f) of continuously supplying a sheathed hot-melt adhesive product;
(g) of immersing the sheathed hot-melt adhesive product in a liquid refrigerant;
(h) of pressing the sheathed adhesive product at a portion thereof;
(i) of ultrasonically welding the sheathed adhesive product at the pressed portion, the welding and pressing steps using a sonotrode; and
(j) of cutting the sheathed adhesive product into a block at the pressed portion, the cutting step being carried out at the same work station as the welding step and being concomitant with it.

* * * * *